(12) United States Patent
Carter et al.

(10) Patent No.: US 8,429,433 B2
(45) Date of Patent: Apr. 23, 2013

(54) DYNAMICALLY ADJUSTING AN OPERATING STATE OF A DATA PROCESSING SYSTEM RUNNING UNDER A POWER CAP

(75) Inventors: John B. Carter, Austin, TX (US); Heather L. Hanson, Austin, TX (US); Karthick Rajamani, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/688,214

(22) Filed: Jan. 15, 2010

(65) Prior Publication Data

US 2011/0178652 A1 Jul. 21, 2011

(51) Int. Cl.
*G06F 1/00* (2006.01)
*G06F 1/26* (2006.01)
*G05D 3/12* (2006.01)
*G01R 21/00* (2006.01)
*G01R 19/00* (2006.01)

(52) U.S. Cl.
USPC ............. 713/300; 713/320; 700/295; 702/60; 702/64

(58) Field of Classification Search .................. 713/300, 713/320; 700/295; 702/60, 64
See application file for complete search history.

(56) References Cited

U.S. PATENT DOCUMENTS

| 5,719,800 | A | 2/1998 | Mittal et al. | |
|---|---|---|---|---|
| 6,944,458 | B2 * | 9/2005 | Jami et al. | 455/450 |
| 7,171,572 | B2 * | 1/2007 | Yamaji et al. | 713/320 |
| 7,444,526 | B2 | 10/2008 | Felter et al. | |
| 8,060,765 | B1 | 11/2011 | Cha et al. | |
| 8,135,970 | B2 * | 3/2012 | Gaskins et al. | 713/322 |
| 2003/0097510 | A1 | 5/2003 | Joseph | |
| 2005/0044429 | A1 | 2/2005 | Gaskins et al. | |
| 2006/0090086 | A1 | 4/2006 | Rotem et al. | |
| 2006/0288241 | A1 | 12/2006 | Felter et al. | |
| 2009/0312848 | A1 | 12/2009 | Anderson et al. | |
| 2011/0029788 | A1 * | 2/2011 | Domingo et al. | 713/300 |

OTHER PUBLICATIONS

U.S. Appl. No. 12/424,158.
Felter, Wes et al., "A Performance-Conserving Approach for Reducing Peak Power Consumption in Server Systems", Proceedings of the 19th Annual International Conference on Supercomputing, Boston, Massachusetts, Jun. 20-22, 2005, pp. 293-302.
Hur, Ibrahim et al., "A Comprehensive Approach to DRAM Power Management", International Symposium on High-Performance Computer Architecture, IBM Corporation, University of Texas at Austin, Feb. 2008, pp. 305-316.
Notice of Allowance mailed Feb. 29, 2012 for U.S. Appl. No. 12/424,158; 18 pages.
Response to Office Action filed Jan. 27, 2012, U.S. Appl. No. 12/424,158, 11 pages.
Bose, Pradip et al., "On-Chip Power Proxy Based Architecture", Filed Apr. 15, 2009, U.S. Appl. No. 12/424,161, 34 pages.

* cited by examiner

*Primary Examiner* — Stefan Stoynov
(74) *Attorney, Agent, or Firm* — Francis Lammes; Stephen J. Walder, Jr.; Eustus D. Nelson (57) ABSTRACT

A mechanism is provided for dynamically power capping one or more units. A power capping mechanism sets a counter value corresponding to an initial energy budget assigned to a unit for a given interval. Responsive to the unit receiving an operation to perform during the given interval, the power capping mechanism decrements the counter value by a decrement value. Responsive to the given interval expiring, the power capping mechanism sends the counter value to a power control loop in the data processing system, receives a new energy budget from the power control loop, and resets the counter value to a value corresponding to the new energy budget assigned to the unit for a next interval.

20 Claims, 4 Drawing Sheets

DYNAMICALLY ADJUSTING AN OPERATING STATE OF A DATA PROCESSING SYSTEM RUNNING UNDER A POWER CAP

GOVERNMENT RIGHTS

This invention was made with Government support under DARPA, HR0011-07-9-0002. THE GOVERNMENT HAS CERTAIN RIGHTS IN THIS INVENTION.

BACKGROUND

The present application relates generally to an improved data processing apparatus and method and more specifically to an apparatus and method for dynamically adjusting an operating state if a data processing system is running under a power cap.

Power capping is a technique for controlling a rate of energy consumed in a group of computing systems, a single computing system, or a subsystem within a computing system over a period of time. The value or setting for a power cap is generally defined by an external or internal management entity. Within a computing system, a power control loop measures power at the input to the computing system and adjusts the input power level of components in the computing system, such as through adjusting voltage, frequency, or the like, to meet the identified power cap setting. If the measured power is less than the power cap, there is more power available for the components of the computing system. Thus, the available power level may be raised by increasing the performance and power consumption of the components of the computing system. If the measured power level exceeds the power cap, the power level must be reduced which reduces the performance of components in the computing system.

Current power cap solutions select conservative voltage/frequency settings based on a recent power control loop interval to provide an adequate power consumption margin in case a workload of the computing system increases before the next power control loop adjustment interval. The power control loop determines a "safety margin" that is a function of control loop frequency and maximum change in workload activity. The power control loop measures power at the current voltage and frequency setting. If the measured power is within the safety margin, the power control loop reduces voltage and frequency of the components in the computing system. If the measured power is lower than the safety margin, the power control loop increases the frequency and voltage of the components in the computing system. However, the conservative safety margins may also waste a power budget and limit the ability to aggressively manage power.

SUMMARY

In one illustrative embodiment, a method, in a data processing system, is provided for dynamically power capping one or more units in accordance with energy consumption trends in the system. The illustrative embodiment sets a counter value corresponding to an initial energy budget assigned to a unit for a given interval. The illustrative embodiment decrements the counter value by a decrement value in response to the unit receiving an operation to perform during the given interval. In response to the given interval expiring, the illustrative embodiment sends the counter value to a power control loop in the data processing system. The illustrative embodiment receives a new energy budget from the power control loop and resets the counter value to a value corresponding to the new energy budget assigned to the unit for a next interval.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for aggressively exploiting a given power cap, such as through aggressively "over-clocking" or "under-voltaging," to safely reduce safety (voltage) margins. The illustrative embodiments use voltage and/or frequency settings in combination with an on-chip energy governor that dynamically power caps the amount of energy a unit, such as a processor, a processor core, a data processing component associated with a processor or processor core, a memory, or the like, may consume over a particular time interval, even if the workload changes dramatically. The energy governor may use a per-unit counter of "joules" that may be consumed by the unit and, as the unit executes an operation, the energy governor reduces the counter by an amount dependent on the operation and the current voltage and frequency settings. While the illustrative embodiments use joules as the unit of energy being consumed by the unit, any unit of energy may be used without departing from the spirit and scope of the invention. If the count value of the counter reaches zero, the unit may be dropped to a safer operating range, placed into a suspend mode, or the like, until the next power control loop interval.

Figure 1:
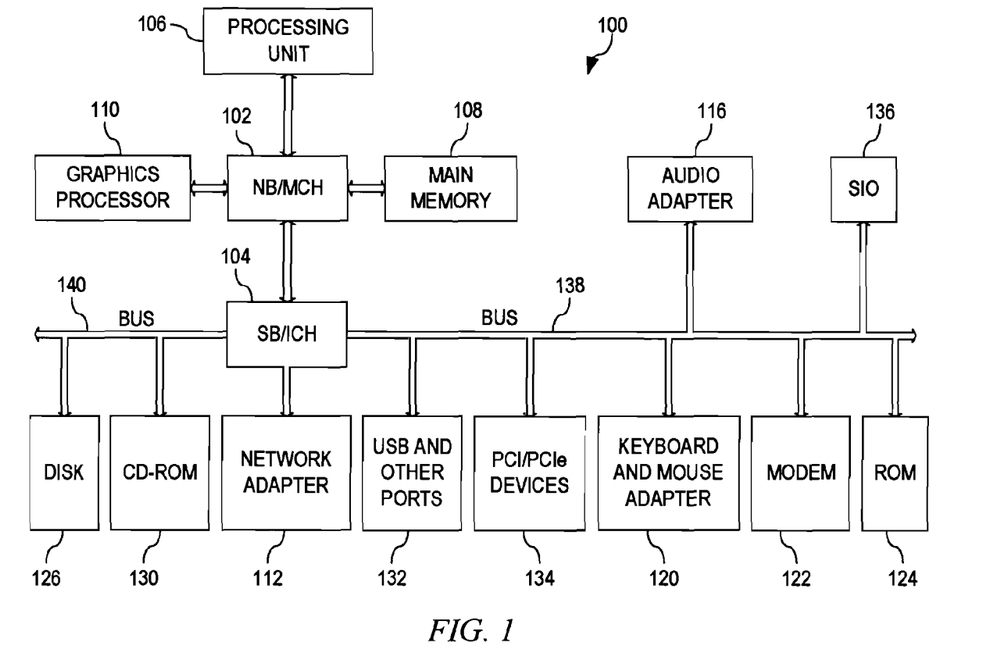
FIG. 1 shows a block diagram of an example data processing system in which aspects of the illustrative embodiments may be implemented.
Figure 2:
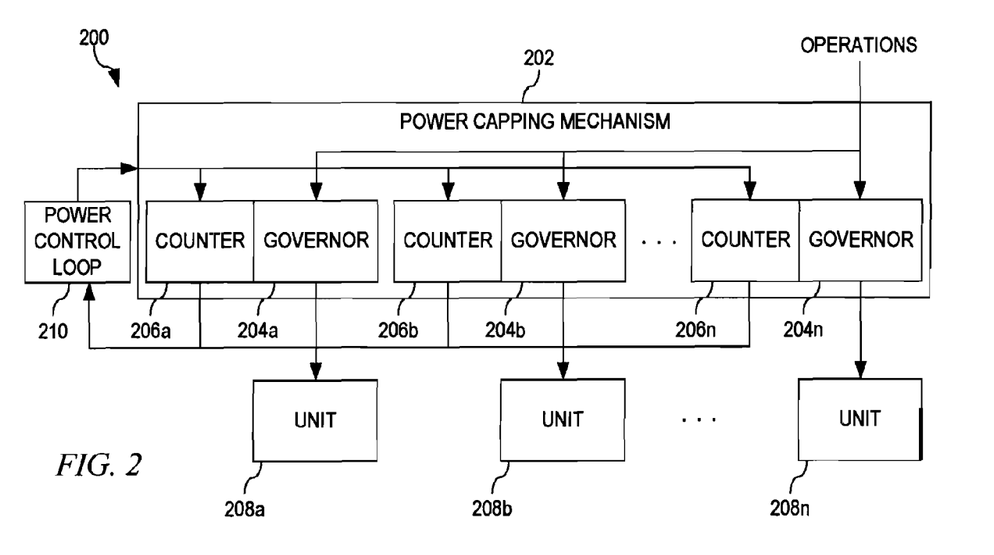
FIG. 2 depicts a block diagram of a power capping mechanism in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a power capping mechanism, this is only an example and is not intended to state or imply any limitation with regard to the features of the present invention. To the contrary, the illustrative embodiments are intended to include distributed data processing environments and embodiments in which power capping may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

The data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

The illustrative embodiments use a power control loop mechanism that runs either continuously, periodically, or in another time controlled manner, to allocate energy or power to a unit or group of units in a data processing system in order to enforce a system-level power cap. In the illustrative embodiments, the power control loop determines an energy budget over a specified processing interval, such as a time interval, number of cycles, or the like, for a unit or group of units that is subject to the power cap of a computing system. The power capping mechanism receives the energy budget from the power control loop and sets a counter associated with the unit or group of units to a value corresponding to the value of the energy budget. As each unit or group of units executes various operations, the counter value is decremented by a value that is dependent on the energy consumption/power requirement of the operation being performed and the current voltage/frequency settings of the unit or group of units. The operations may be operations performed by a processor or processor core, such as register reads, register writes, load/store prefetches, or the like, or operations performed outside of the processor or processor core, such as dynamic random access memory (DRAM) accesses, I/O transactions, bus traffic operations, or the like.

For example, the power capping mechanism may receive an energy budget for an arithmetic unit in the data processing system of 2 joules, set an associated counter to the 2 joules value, and decrement the counter by 5 nanojoules every time a particular arithmetic operation, such as an add, subtract, or the like, is performed by the arithmetic unit based on the worst case energy required to perform that arithmetic operation. As another example, the power capping mechanism may receive an energy budget for a memory controller of the data processing system of 5 joules, set an associated counter to the 5 joules value, and decrement the counter by 25 nanojoules every time a particular memory operation, such as an read, write, or the like, is performed based on the worst case energy required to perform the particular memory operation. As still another example, the power capping mechanism may receive an energy budget for an entire core in the data processing system of 400 joules, set an associated counter to the 400 joules value, and decrement the counter each cycle by the sum total of energy costs of operations performed by various units within the core during the (previous) cycle, such as, the energy costs of the arithmetic operations, register operations, memory operations, bus operations, or the like. Other energy costs may be independent of operations, for example, there may be an energy cost for each byte of cache that is enabled (to account for leakage), regardless of whether the byte of cache is accessed in a given cycle or not.

Using the value of the counter, a governor of the power capping mechanism may place the unit or group of units into a safer operating range by shifting a voltage and/or a frequency using Dynamic Voltage and Frequency Scaling (DVFS) supplied to the unit to a known safe execution state, suspend the unit or group of units if the counter value reaches zero, or perform some other action to enforce the energy budget of the unit or group of units. At the next interval, the power control loop measures the power at the current voltage and frequency settings of the unit or group of units. The power control loop determines a new energy budget for the unit or group of units based upon the power cap of a computing system, the new measurements, and the value of the counter at the end of the interval. The power capping mechanism receives the new energy budget and sets a counter associated with the unit or group of units to the value of the new energy budget and the process starts over.

FIG. 2 depicts a block diagram of a dynamically adjustable power capping mechanism in accordance with an illustrative embodiment. Power capping mechanism 202 within data processing system 200 comprises governors 204a-204n and counters 206a-206n which are respectively associated with units 208a-208n. Units 208a-208n may be processors in a multiprocessor system, processor cores within a multi-core processor, individual function units, such as arithmetic logic units (ALUs), vector units, load/store units, or the like. Units 208a-208n may also be considered as a group or collective unit that operates cooperatively, such as units along a floating-point pipeline, units along an integer pipeline, units associated with a fetch instruction sequencer, or the like. When data processing system 200 is initialized, power control loop 210 identifies a power cap based on a power cap policy for data processing system 200. Power control loop 210, which may include a program executed on a control processor in data processing system 200, determines an energy budget for each of units 208a-208n based on the power cap and the initial voltage, frequency settings, or the like, of each unit. For example, power control loop 210 may take into consideration the energy cost of a given operation depending on the voltage. That is, an add operation performed while the processor is running with a 1.1V Vdd may consume more energy than the same add when the processor is running with a 0.85V Vdd. Power control loop 210 may also take into consideration leakage energy that may also be higher for higher supply voltages. Power control loop may also consider a frequency component based on the frequencies impact on the number of cycles in a given time interval. Even further, power control loop 210 may consider the energy consumed based on temperature of data processing system 200.

The initial energy budget determined by power control loop 210 may include an initial margin, which may either be a margin to ensure adequate performance or a margin to avoid unnecessary throttling, as power control loop 210 has no initial insight as to the workload that will be executed by each of units 208a-208n. The margin to ensure adequate performance may be a voltage margin that ensures that even if there is a sudden expected burst of activity, the supply voltage reaching each transistor (Vdd) does not "droop" below the level required for that transistor to complete its operation before the end of a given clock cycle. More accurately, the margin to ensure adequate performance ensures that the collection of transistors in a given path of combinatorial logic may complete before the end of the given clock interval, so that the correct values are stored into the corresponding data "latch".

Once power control loop 210 determines an initial energy budget for each of units 208a-208n, power control loop 210 sends the initial energy budgets to power capping mechanism 202. Power capping mechanism 202 uses the initial energy budget identified for each of units 208a-208n to set counter values in each of counters 206a-206n associated with units 208a-208n. When each of units 208a-208n execute a received operation, counter 206a-206n associated with units 208a-208n that executed the operation reduces its counter value by a set predetermined value or a dependent value that is dependent on the operation that is being executed. A detailed description of determining a value that is dependent on the operation being executed is detailed in FIGS. 3A and 3B.

If, during an predetermined interval between when power control loop 210 determines the initial energy budget used for each of counters 206a-206n and the next time power control loop 210 determines a new energy budget for each of units 208a-208n, the value of one or more of counters 206a-206n reaches zero or less than zero, the associated one or more of governors 204a-204n may place one or more of units 208a-208n into a safer operating range, suspend the operation intended for the associated one or more of units 208a-208n, or perform some other action to enforce the energy budget of the unit or group of units until a new energy budget is determined for the unit and the counter value is reset. Additionally, even if the counter value of counters 206a-206n were to reach zero and the above actions are implemented by governors 204a-204n to suspend units 208a-208n, the value of counters 206a-206n may still be reduced by the number of operations that are queued for the associated suspended unit such that the counter value may be negative until reset.

Upon completion of the predetermined interval, power control loop 210 makes new measurements of the power at the current voltage and frequency settings of each of units 208a-208n. Power control loop 210 determines a new energy budget. However in determining the new energy budget for each of units 208a-208n, power control loop 210 not only uses the power cap of a computing system and the new measurements, but also uses the counter values of the associated counters 206a-206n. That is, if power control loop 210:

determines that the counter value of a counter associated with a unit is much greater than zero (counter value>a predetermined value>0), indicating that the unit did not execute the workload initially estimated, power control loop 210 may allocate a reduced new energy budget;

determines that the counter value of a counter associated with a unit is close to zero (a predetermined value>counter value>0) or (0>counter value>a predetermined value), indicating that the unit executed close to the estimated workload, power control loop 210 may leave the new energy budget the same as the previous energy budget; or     determines that the counter value of a counter associated with a unit is much less than zero (0>a predetermined value>counter value), indicating that the unit executed or wanted to execute more workload than initially estimated, power control loop 210 may allocate an increased new energy budget.

Additionally, power control loop 210 may also consider a priority associated with the unit or group of units within data processing system 200 where a unit or group of units with a higher priority are allocated a higher energy budget than a unit or group of units with a lower priority. Further, power control loop 210 may also consider interdependencies of groups when determining new energy budgets. For example, if the event counter associated with a group of units associated with a floating-point pipeline indicates that its new energy budget needs to decrease based on the event count and the event counter associated with a fetch/instruction sequencer indicates its new energy budget needs to increase based on the vent count, the energy allocated to a group of units associated with an integer pipeline may conditionally increase by a percentage because of the energy count associated with the fetch/instruction sequencer. As another example, if the event counter associated with a group of units associated with a floating-point pipeline indicates that its new energy budget needs to decrease based on the event count and if the event counter associated with a group of units associated with a integer pipeline indicates that its new energy budget needs to decrease based on the event count, the unused energy may be allocated elsewhere if another unit or group of units needs the excess energy.

Once power control loop 210 determines a new energy budget for each of units 208a-208n, power control loop 210 sends the new energy budgets to power capping mechanism 202. Power capping mechanism 202 uses the new energy budget identified for each of units 208a-208n to set counter values in each of counters 206a-206n associated with units 208a-208n and the process starts over.

Figure 3A:
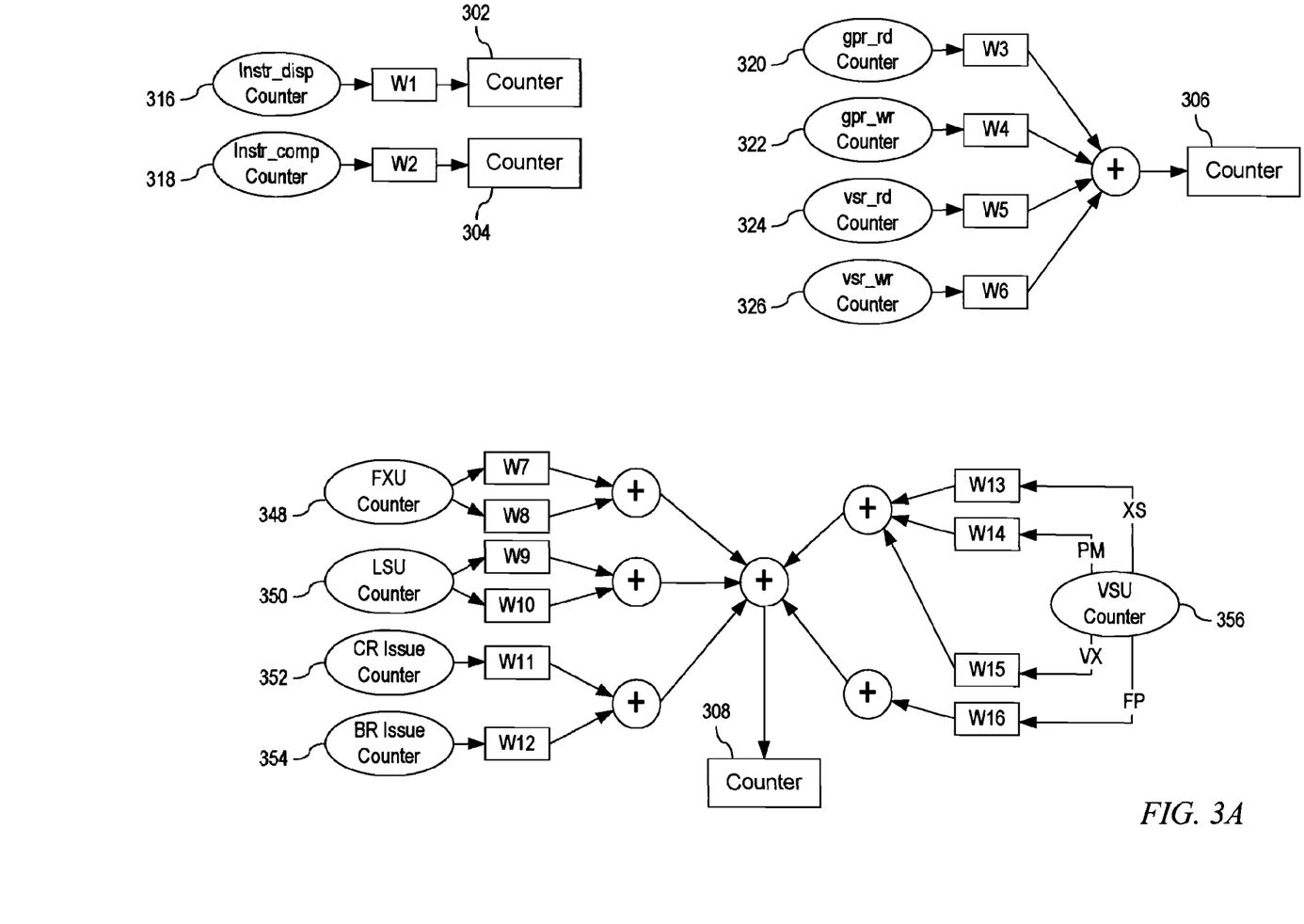
FIGS. 3A and 3B illustrate a block diagram of exemplary core activity counting in accordance with an illustrative embodiment.
Figure 3B:
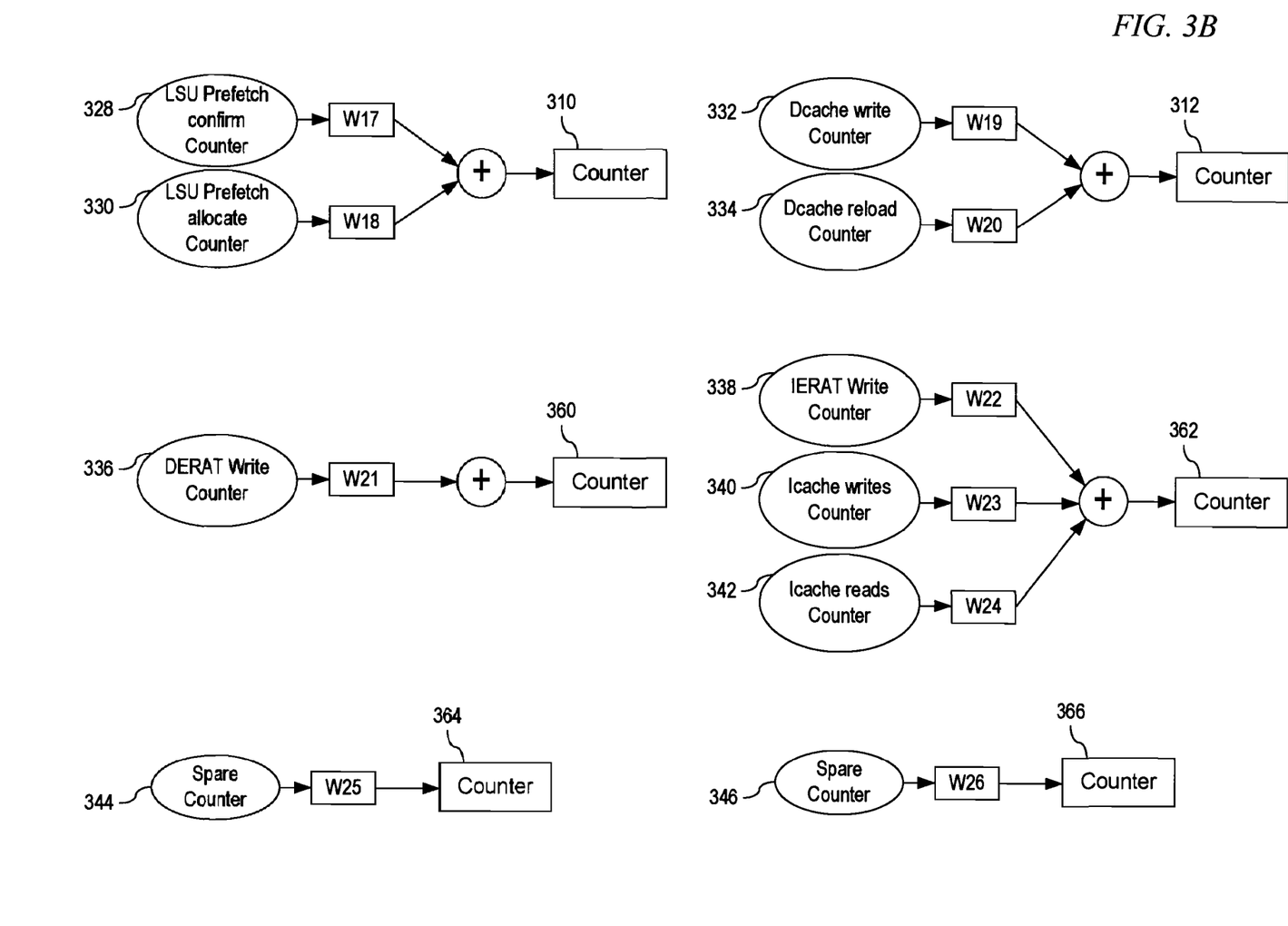

FIGS. 3A and 3B illustrate a block diagram of exemplary core activity counting in accordance with an illustrative embodiment. The activities illustrated in FIGS. 3A and 3B are examples of activities to be counted and eventually stored as a value in a master counter (not shown) such as counters 206a-206n of FIG. 2. Counters 302-356 and 360-366 may be counters in a power proxy unit. In one illustrative embodiment, before being stored in counters, the power proxy unit may divide the values that are to be stored in counters 316-326 by a certain value prior to storing the value in counters 316-326. Weights W1-W26 are weights associated with the activities being counted. In an illustrative embodiment, weights W1-W26 are four (4) bit values.

Instr_disp counter 316 counts instructions dispatched and instr_comp counter 318 counts instructions completed. The power proxy unit multiplies the count in instr_disp counter 316 by weight W1 and this total value is stored in counter 302. The power proxy unit multiplies the count in instr_comp counter 318 by weight W2 and this total value is stored in counter 304.

Gpr_rd counter 320 counts general purpose register reads (gpr_rd), gpr_wr counter 322 counts general purpose register writes (gpr_wr), vsr_rd counter 324 counts vector register file reads (vsr_rd), and vsr_wr counter 326 counts vector register file writes (vsr_wr). The power proxy unit multiplies the count in gpr_rd counter 320 by weight W3 and sums this total value with the total value of the count in gpr_wr counter 322 multiplied by weight W4 and the total value of the count in vsr_rd counter 324 multiplied by weight W5 and the total value of the count in vsr_wr counter 326 multiplied by weight W6 stored in counter 306.

Load/store unit (LSU) prefetch confirm counter 328 stores a count of LSU prefetches confirmed. LSU prefetch allocate counter 330 stores a count of LSU prefetches allocated. Counter 310 stores a value equal to the count in LSU prefetch confirm counter 328 multiplied by weight W17 summed with the count from LSU prefetch allocate counter 330 multiplied by weight W18. Counter 360 stores a value equal to the count in data cache effective to real translation (DERAT) write counter 336 multiplied by weight W21.

Dcache write counter 332 stores a count of data cache writes. Dcache reload counter 334 stores a count of data cache reloads. Counter 312 stores a value equal to the sum of the count in Dcache write counter 332 multiplied by weight W19 and the count in Dcache reload counter 334 multiplied by weight W20.

Icache writes counter 340 stores count of instruction cache writes. Icache reads counter 342 stores a count of instruction cache reads. Instruction cache effective to real address translation (IERAT) write counter 338 stores a count of IERAT writes. Counter 362 stores a value equal to the sum of the count in IERAT write counter 338 multiplied by weight W22, the count in Icache writes counter 340 multiplied by weight W23, and the count in Icache reads counter 342 multiplied by weight W24.

Fixed-point execution unit (FXU) counter 348 stores a count of various instructions issued to an FXU unit. The power proxy unit multiplies the count of these instructions by a corresponding weight, such as weight W7 and W8, forming adjusted values. The power proxy unit sums the adjusted values together with the adjusted values from the other counters and stores the summed value in counter 308. For example, weight W7 may correspond to instructions to multiply while weight W8 may correspond to instructions to divide. LSU counter 350 stores a count of load instructions issued plus a count of store instructions issued. The power proxy unit multiplies the count of load instructions issued by a weight W9 and multiplies the count of store instructions issued by a weight of W10, forming adjusted values. The power proxy unit sums the adjusted values together with the adjusted values from the other counters stored in counter 308. CR issue counter 352 stores a count of control register instructions issued. The power proxy unit multiplies the count of control register instructions issued by a weight W11, forming an adjusted value. The power proxy unit sums the adjusted values together with the adjusted values from the other counters stored in counter 308. BR issue counter 354 stores a count of branch instructions issued. The power proxy unit multiplies the count of branch instructions issued by a weight W12, forming an adjusted value. The power proxy unit sums the adjusted values together with the adjusted values from the other counters stored in counter 308.

Vector/scalar unit (VSU) counter 356 stores a count of activities, which includes activities performed by both a VSU and a floating-point unit (FPU), only some of which are shown in FIGS. 3A and 3B. In the present example, VSU counter 356 stores a count equal to a sum of the count of permutation (PM) operations plus a count of floating point (FP) operations plus a count of simple vector (XS) operations plus a count of complex vector (VX) operations. The power proxy unit multiplies the count of the various operations by a corresponding weight, weight W13-16, summed together and sums the adjusted values from the other counters and stores the value in counter 308.

Spare counters 344 and 346 represent additional activities that may be assigned a weight, W25 and W26, and tracked, depending upon a determination made by an authorized user, such as a designer. The master counter sums together counters 302-312 and 360-366 in order to form a total activity count for the time interval. The master counter logic applies an estimate of energy consumed per unit per count to reduce the remaining energy budget by an amount equivalent to the energy expended in the current time interval. The reduction amount is dependent on the unit activity, voltage, frequency, and other power-management settings. To determine the amount of energy to deduct from the total energy budget for each event, the power proxy unit may apply an estimate of energy consumed per master counter event, where power consumption is a function of voltage, frequency, and/or other power-management settings.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc., or any suitable combination thereof.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
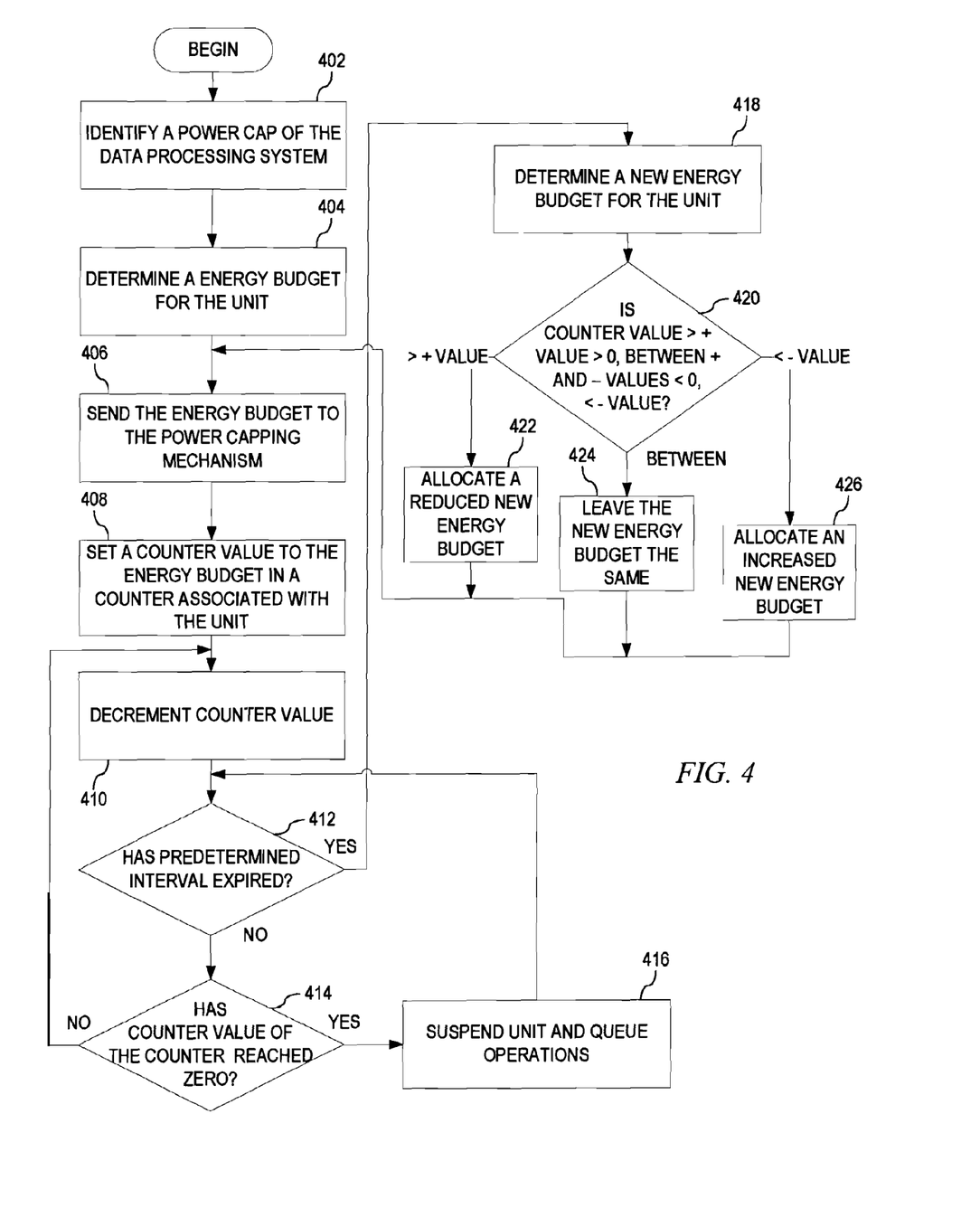
FIG. 4 provides a flowchart outlining example operations of a power capping mechanism in accordance with an illustrative embodiment.

Referring now to FIG. 4, this figure provides a flowchart outlining example operations of a power capping mechanism in accordance with an illustrative embodiment. The following operation is described for one unit; however, one of ordinary skill in the art would recognize that the operation may performed for or group of units as well as all units or groups of units associated with a data processing system. As the operation begins, a power control loop identifies a power cap of the data processing system based on a predetermined policy for the data processing system (step 402). The power control loop determines an energy budget for the unit based on the power cap, the initial voltage and frequency settings of the unit, and the length of the control loop interval (step 404). The energy budget determined by the power control loop may include an initial margin as the power control loop has no initial insight as to the workload that will be executed by the unit. Once the power control loop determines an initial energy budget for the unit, the power control loop sends the energy budget to the power capping mechanism (step 406).

The power capping mechanism sets a counter value to a corresponding energy budget in a counter associated with the unit for a given interval (step 408). When the unit executes an operation during the given interval, the counter decrements its counter value by a set predetermined value or a value that is dependent on the operation that is being executed (step 410). A governor associated with the unit determines whether a predetermined interval has expired (step 412). If at step 412 the predetermined interval has not expired, the governor determines whether the counter value of the counter has reached zero (step 414). If at step 414 the counter value is not zero, the governor allows any received operation to pass to the unit with the operation returning to step 410. If at step 414 the counter value is zero, the governor suspends the unit and queues all operations for the unit (step 416) with the operation returning to step 412.

If at step 412 the predetermined interval has expired, the power control loop determines a new energy budget for the unit (step 418) using the power cap of the data processing system, measurements of the current frequency and voltage of the unit, and the counter value of the counter. The power control loop determines whether the counter value is greater than a positive predetermined value that is greater than zero, whether the counter value is between the positive predetermined value and a negative predetermined value that is less than zero, or whether the counter value is less than the negative predetermined value (step 420). If at step 420 the counter value is greater than the positive predetermined value, the power control loop may allocate a reduced new energy budget for the next time interval (step 422), with the operation returning to step 406. If at step 420 the counter value is between the positive predetermined value and the negative predetermined value, the power control loop leaves the new energy budget the same as the previous energy budget for the next time interval (step 424), with the operation returning to step 406. If at step 420 the counter value is less than the negative predetermined value, the power control loop may allocate an increased new energy budget for the next time interval (step 426), with the operation returning to step 406.

Thus, the illustrative embodiments provide mechanisms for a dynamic power capping mechanism that receives the energy budget and sets a counter associated with the unit or group of units to the value of the energy budget. Then, as each unit or group of units executes various operations, the counter is reduced by a value that is dependent on the operation and the current voltage/frequency settings of the unit. Using the value of the counter, a governor of the power capping mechanism of the illustrative embodiments may place the unit or group of units into a safer operating range by shifting a voltage and/or a frequency of the unit to a known safe execution state, suspend the unit or group of units if the counter value reaches zero, or perform some other action to enforce the energy budget of the unit or group of units. At the next interval, the power control loop makes new measurements of the power at the current voltage and frequency settings of the unit or group of units. The power control loop determines a new voltage and frequency at which to run the unit or group of units, and a new energy budget for the unit or group of units based upon the power cap of a computing system, the priority of different units within the system, the new measurements, and the value of the counter at the end of the interval. The power capping mechanism receives the new energy budget and sets a counter associated with the unit to the value of the new energy budget and the process starts over.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamically power capping one or more units, the method comprising;
   setting, by a power capping mechanism, a counter value corresponding to an initial enemy budget assigned to a unit for a given interval;
   responsive to the unit receiving an operation to perform during the given interval, decrementing, by the power capping mechanism, the counter value by a decrement value; and
   responsive to the given interval expiring:
      sending, by the power capping mechanism, the counter value to a power control loop in the data processing system;
      receiving, by the power capping mechanism, a new energy budget from the power control loop; and
      resetting, by the power capping mechanism, the Counter value to a new value corresponding to the new energy budget assigned to the unit for a next interval.

2. The method of claim 1, further comprising:
   responsive to the counter value reaching zero or less than zero and the given interval failing to be expired, performing, by a governor in the power capping mechanism, an action to enforce the energy budget of the unit until the new energy budget is received; and
   queuing, by the governor, all new operations received for the unit until the new energy budget is received.

3. The method of claim 1, wherein the action to enforce the energy budget of the unit is at least one of placing the unit into a safer operating range by shifting a voltage and/or a frequency of the unit to a known safe execution state or suspending the unit.

4. The method of claim 1, wherein the power control loop determines the new energy budget by a method comprising:
   determining, by the power control loop, whether the counter value is greater than a positive predetermined value that is greater than zero, whether the counter value is between the positive predetermined value and a negative predetermined value that is less than zero, or whether the counter value is less than the negative predetermined value;
   responsive to the counter value being greater than the positive predetermined value, reducing, by the power control loop, the voltage and frequency of the unit thereby producing a reduced new energy budget to be used as the new energy budget;
   responsive to the counter value being between the positive predetermined value and the negative predetermined value, leaving, by the power control loop, the voltage and frequency of the unit the same thereby producing a similar energy budget that is similar to the initial energy budget to be used as the new energy budget; and
   responsive to the counter value being less than the negative predetermined value, increasing, by the power control loop, the voltage and frequency of the unit thereby producing an increased new energy budget to be used as the new energy budget.

5. The method of claim 1, wherein the power control loop determines the new energy budget by a method comprising:
   determining, by the power control loop, a first new energy budget for a first unit;
   determining, by the power control loop, a second new energy budget for a second unit;
   responsive to the first new energy budget decreasing from a first previous setting and the second new energy budget increasing from a second previous setting, increasing, by the power control loop, a third new energy budget for a third unit;
   responsive to the first new energy budget increasing from the first previous setting and the second new energy budget decreasing from the second previous setting, decreasing, by the power control loop, the third new energy budget for the third unit; and
   responsive to the first new energy budget decreasing from the first previous setting and the second new energy budget decreasing from the second previous setting, decreasing, by the power control loop, the third new energy budget for the third unit.

6. The method of claim 1, wherein the power control loop determines the initial energy budget for the unit based on the power cap of the data processing system and the initial voltage and frequency settings of the unit.

7. The method of claim 6, wherein the initial energy budget determined by the power control loop includes an initial margin and wherein the initial margin is at least one of a safety margin or a margin to avoid unnecessary throttling.

8. The method of claim 1, wherein the new value is at least one of a set predetermined value or a dependent value that is dependent on the operation that is to be executed by the unit.

9. The method of claim 8, where determining the dependent value further comprises:
   storing, by a power proxy unit in the power capping mechanism, a weighted value for each operation in a plurality of operations in an assigned counter of a first set of counters thereby forming a set of stored values, wherein the weighted value comprises a count registered by an assigned counter multiplied by a first weight factor specific to the operation;
   grouping, by the power proxy unit, various operations in the set of operations into subsets;
   summing, by the power proxy unit, the stored values corresponding to each operation in each subset to reach a total value for each subset;
   multiplying, by the power proxy unit, for each subset, the total value of the subset by a second weight factor corresponding to the subset to form a sealed value for the subset;
   summing, by the power proxy unit, the scaled values for the subsets to form a master count value; and
   sending, by the power proxy unit, a power usage estimate value of the unit to the counter.

10. The method of claim 1, wherein the new energy budget is based upon at least one of a power cap of the data processing system, measurements of a current frequency and voltage of the unit, the counter, or a priority of the unit.

11. A computer program product comprising a non-transitory computer readable medium having a computer readable program recorded thereon, wherein the computer readable program, when executed on a computing device, causes the computing device to:
   set a counter value corresponding to an initial energy budget assigned to a unit for a given interval;
   responsive to the unit receiving an operation to perform during the given interval, decrement the counter value by a decrement value; and responsive to the given interval expiring:
  send the counter value to a power control loop in the data processing system;
  receive a new energy budget from the power control loop; and
  reset the counter value to a new value corresponding to the new energy budget assigned to the unit for a next interval.

12. The computer program product of claim 11, wherein the computer readable program further causes the computing device to:
  responsive to the counter value reaching zero or less than zero and the given interval failing to be expired, perform an action to enforce the energy budget of the unit until the new energy budget is received; and
  queue all new operations received for the unit until the new energy budget is received.

13. The computer program product of claim 11, wherein the action to enforce the energy budget of the unit is at least one of placing the unit into a safer operating range by shifting a voltage and/or a frequency of the unit to a known safe execution state or suspending the unit.

14. The computer program product of claim 11, wherein the computer readable program to determine the new energy budget further causes the computing device to:
  determine whether the counter value is greater than a positive predetermined value that is greater than zero, whether the counter value is between the positive predetermined value and a negative predetermined value that is less than zero, or whether the counter value is less than the negative predetermined value;
  responsive to the counter value being greater than the positive predetermined value, reduce the voltage and frequency of the unit thereby producing a reduced new energy budget to be used as the new energy budget;
  responsive to the counter value being between the positive predetermined value and the negative predetermined value, leave the voltage and frequency of the unit the same thereby producing a similar energy budget that is similar to the initial energy budget to be used as the new energy budget; and
  responsive to the counter value being less than the negative predetermined value, increase the voltage and frequency of the unit thereby producing an increased new energy budget to be used as the new energy budget.

15. The computer program product of claim 11, wherein the computer readable program to determine the new energy budget further causes the computing device to:
  determine a first new energy budget for a first unit;
  determine a second new energy budget for a second unit;
  responsive to the first new energy budget decreasing from a first previous setting and the second new energy budget increasing from a second previous setting, increasing third new energy budget for a third unit;
  responsive to the first new energy budget increasing from the first previous setting and the second new energy budget decreasing from the second previous setting, decreasing the third new energy budget for the third unit; and
  responsive to the first new energy budget decreasing from the first previous setting and the second new energy budget decreasing from the second previous setting, decreasing the third new energy budget for the third unit.

16. An apparatus, comprising,
a processor; and
a memory coupled to the processor, wherein the memory comprises instructions which, when executed by the processor, cause the processor to:
set a counter value corresponding to an initial energy budget assigned to a unit for a given interval;
responsive to the unit receiving an operation to perform during the given interval, decrement the counter value by a decrement value; and
responsive to the given interval expiring:
  send the counter value to a power control loop in the data processing system;
  receive a new energy budget from the power control loop; and
  reset the counter value to a new value corresponding to the new energy budget assigned to the unit for a next interval.

17. The apparatus of claim 16, wherein, the instructions further cause the processor to:
  responsive to the counter value reaching zero or less than zero and the given interval failing to be expired, perform an action to enforce the energy budget of the unit until the new energy budget is received; and
  queue all new operations received for the unit until the new energy budget is received.

18. The apparatus of claim 16, wherein the action to enforce the energy budget of the unit is at least one of placing the twit into a safer operating range by shifting a voltage and/or a frequency of the unit to a known safe execution state or suspending the unit.

19. The apparatus of claim 16, wherein the instructions to determine the new energy budget further cause the processor to:
  determine whether the counter value is greater than a positive predetermined value that is greater than zero, whether the counter value is between the positive predetermined value and a negative predetermined value that is less than zero, or whether the counter value is less than the negative predetermined value;
  responsive to the counter value being greater than the positive predetermined value, reduce the voltage and frequency of the unit thereby producing a reduced new energy budget to be used as the new energy budget;
  responsive to the counter value being between the positive predetermined value and the negative predetermined value, leave the voltage and frequency of the unit the same thereby producing a similar energy budget that is similar to the initial energy budget to be used as the new energy budget; and
  responsive to the counter value being less than the negative predetermined value, increase the voltage and frequency of the unit thereby producing an increased new energy budget to be used as the new energy budget.

20. The apparatus of claim 16, wherein the instructions to determine the new energy budget further cause the processor to:
  determine a first new energy budget for a first unit;
  determine a second new energy budget for a second unit;
  responsive to the first new energy budget decreasing from a first previous setting and the second new energy budget increasing from a second previous setting, increasing a third new energy budget for a third unit;
  responsive to the first new energy budget increasing from the first previous setting and the second new energy budget decreasing from the second previous setting, decreasing the third new energy budget for the third unit; and responsive to the first new energy budget decreasing from the first previous setting and the second new energy budget decreasing from the second previous setting, decreasing the third new energy budget for the third unit.

* * * * *